United States Patent [19]

Oosterling et al.

[11] 4,137,783

[45] Feb. 6, 1979

[54] DEVICE FOR CONVERTING A ROTARY MOVEMENT INTO A RECIPROCATORY MOVEMENT

[75] Inventors: Pieter A. Oosterling, Nieuw-Vennep; Antoine M. R. Baecke, Hoofddorp, both of Netherlands

[73] Assignee: Multinorm B.V., Nieuw-Vennep, Netherlands

[21] Appl. No.: 731,838

[22] Filed: Oct. 12, 1976

[30] Foreign Application Priority Data

Oct. 13, 1975 [NL] Netherlands ......................... 7512030

[51] Int. Cl.² ............................................. F16H 21/42
[52] U.S. Cl. .......................................... 74/47; 74/89.1
[58] Field of Search ....................... 74/89.1, 82, 64, 60

[56] References Cited
U.S. PATENT DOCUMENTS

| 1,901,981 | 3/1933 | Ousback | 74/60 |
| 3,400,595 | 9/1968 | Pfeiffer | 74/70 |

FOREIGN PATENT DOCUMENTS 465667  9/1951  Italy ............................................. 74/64

*Primary Examiner*—Benjamin W. Wyche
*Assistant Examiner*—Wesley S. Ratliff, Jr.
*Attorney, Agent, or Firm*—Snyder, Brown & Ramik

[57] ABSTRACT

The invention relates to a device for converting a rotary movement into an oscillating movement frequently employed in agricultural implements, comprising a rotatable driving shaft, a fly-wheel rigidly secured thereto, an oscillatorily driven body adapted to oscillate about an axis crossing or intersecting the driving shaft axis and a coupling element pivoted to said body and journalled eccentrically in the fly-wheel; to adjusting in a simple manner the magnitude of the oscillating movement or the amplitude thereof, the device is adapted in that the bearing of the coupling element in the fly-wheel is arranged in a displaceable manner for varying the eccentricity and hence the amplitude of the oscillatory movement.

16 Claims, 7 Drawing Figures

U.S. Patent Feb. 6, 1979 Sheet 1 of 2 4,137,783
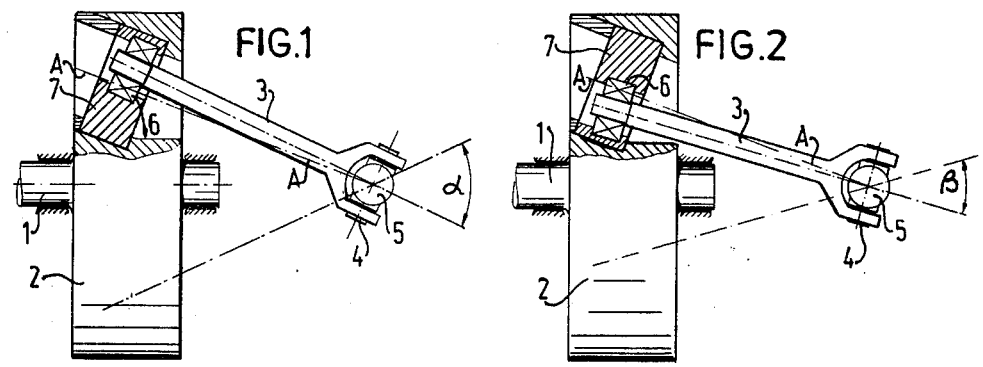
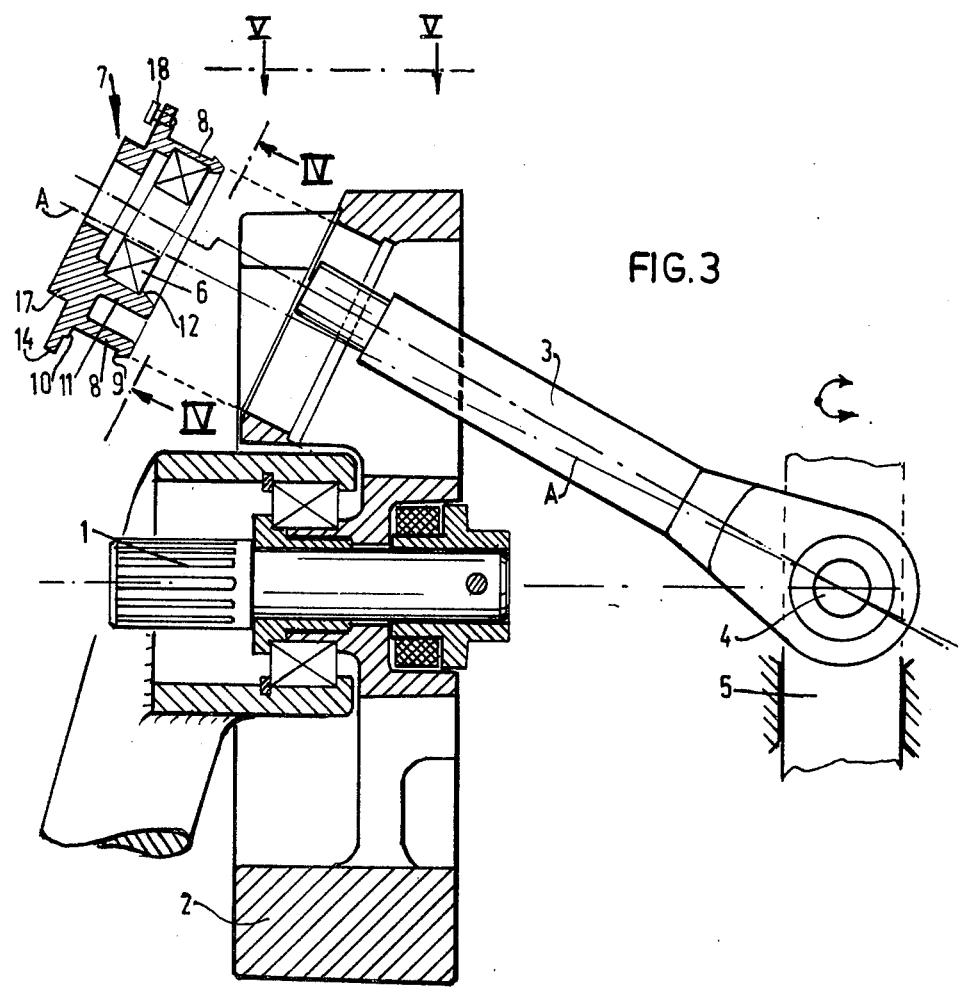

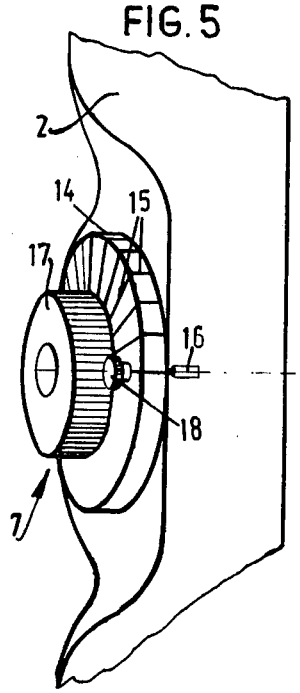
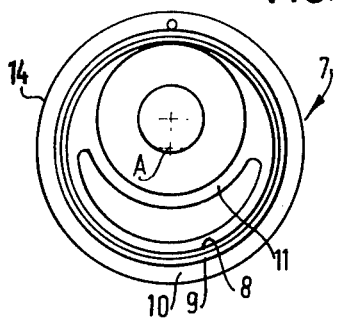
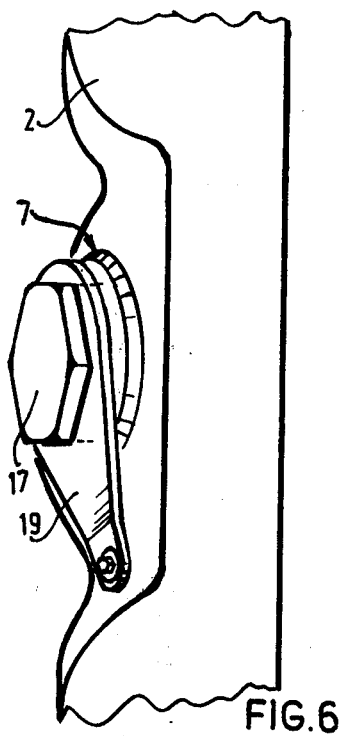
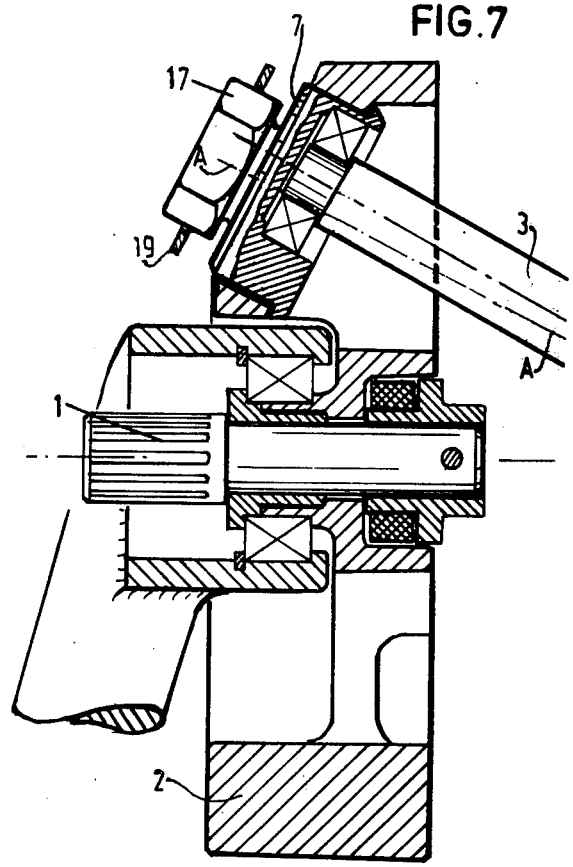

DEVICE FOR CONVERTING A ROTARY MOVEMENT INTO A RECIPROCATORY MOVEMENT

The invention relates to a device for converting a rotary movement into an oscillatory movement comprising a rotatable driving shaft, a fly-wheel rigidly secured thereto, an oscillatorily driven body adapted to oscillate about an axis crossing or intersecting the driving shaft axis and a coupling element pivoted to said body and journalled eccentrically in the fly-wheel.

Such a converting device is frequently employed in agricultural implements, particularly in an oscillatory fertilizer distributor, in which the driving shaft is caused to rotate, for example, by the power take-off shaft of an agricultural tractor and the oscillatory driven body constitutes the support for the tool, for example, a spreading pipe or reciprocatory harrow beams.

The object of the invention is to adjust in a simple manner the magnitude of the oscillatory movement or the amplitude thereof. Owing to this adjustability the desired spreading width or the stroke of the harrow tines can be adjusted in a simple manner.

For this purpose the invention provides a device of the kind set forth, which is characterized in that the bearing of the coupling element in the fly-wheel is arranged in a displaceable manner for varying the eccentricity and hence the amplitude of the oscillatory movement.

In a preferred embodiment the fly-wheel bearing of the coupling element is eccentrically accomodated in a member, which can be disposed in the fly-wheel in more than one angular position.

If in one embodiment of the invention said member is circle-cylindrical, the adjustment can only be carried out by turning the member. In this case a scale on the member may be used for a simple indication of the angular position. The invention proposes the provision of an element for locking the member in the fly-wheel.

A very useful structure of such a locking element is formed by a safety plate fastened to the fly-wheel and having a polygonal opening fitting around a correspondingly polygonal extension of the member. The safety plate is preferably elastic so that the locking or adjustment of the member can be readily carried out by bending the safety plate.

Other features of the invention will become apparent from the following description of one embodiment. In the drawing:

FIG. 1 is an elevational view and partly a sectional view of the transmission device in accordance with the invention, FIG. 2 is an elevational view and a sectional view like FIG. 1 in a different position of the coupling element, FIG. 3 is an axial sectional view of the fly-wheel with a preferred embodiment of the member to be disposed in an angular position for journalling the coupling element, FIG. 4 is an elevational view of the member taken on the line IV—IV in FIG. 3, FIG. 5 is a plan view of the fly-wheel taken on the line V—V in FIG. 3, FIG. 6 and FIG. 7 are an elevational view and a sectional view respectively of a variant of the adjustable supporting member.

Referring to the Figures, reference numeral 1 designates the driving shaft, 2 the fly-wheel fastened thereto, 3 the coupling element eccentrically journalled in the fly-wheel and 4 the spindle of the hinge between the coupling element 3 and the oscillatorily driven body caused to oscillate about an axis 5 crossing the axis of the driving shaft 1 (see FIG. 3). The oscillatory body may have fastened to it a tool (not shown).

From FIGS. 1, 2 and 3 it is apparent that the coupling element 3 is inserted by its end facing the fly-wheel 2 into a bearing 6, for example, a roller bearing, which is arranged in a member 7 fitting in a recess of the fly-wheel 2. In the embodiment shown the supporting member 7 can be placed in different angular positions in the fly-wheel 2 by turning and fixing it about the axis A—A in the fly-wheel 2.

Since the bearing 6 is arranged in the supporting member 7 eccentrically to the axis A—A the bearing 6 will get each time at a different radial distance from the driving shaft 1 in accordance with the angular position of the supporting member 7. From FIGS. 1 and 2 it will be apparent that with a large radial distance the turning angle of the coupling element 3 is large (see angle $\alpha$ in FIG. 1), whereas with a small radial distance the turning angle is small (see angle $\beta$ in FIG. 2). Obviously by adjusting the eccentricity or the radial distance between the bearing 6 and the driving shaft 1 the amplitude of the oscillatory movement about the spindle 5 can be adjusted.

FIG. 3 illustrates a preferred embodiment of the supporting member 7, which is shown in the dismounted state with repect to the fly-wheel 2. The supporting member 7 is preferably formed by a thin-walled sleeve, the thin wall 8 being provided on either end with a radially projecting collar 9, 10, the outer circumference of the wall 8 corresponding with the inner circumference of the recess in the fly-wheel 2. Owing to the thin wall the supporting member 7 can be elastically inserted into the recess of the fly-wheel 2, the radially protruding collars 9, 10 getting into positions on either side of the recess in the fly-wheel. It is furthermore preferred to provide in the thin-walled sleeve 8 of a supporting member 7 a second thin-walled sleeve 11 in an eccentric position in which the bearing 6 is retained. This thin-walled sleeve 11 is provided on the inner side with two radially extending collars 12, 13 so that after the insertion of the bearing 6 these collars are lying one on each side of the outer ring of the bearing.

FIG. 4 clearly shows that the inner sleeve 11 is eccentrical to the outer sleeve 8. It should be noted here that the supporting member 7 is particularly suitable for being manufactured from injection-casting material. In this manner the eccentrical displacement of the bearing of the coupling element 3 in the fly-wheel can be ensured simply at low cost.

On the side of the collar 10 the outer sleeve part 8 is preferably prolonged by a radially protruding rim 14 having on its outer side a scale indication 15 (FIG. 5) so that the angular position of the supporting member 7 with respect to the fly-wheel having a mark 16 can be readily observed. When the transmission mechanism is used in fertilizer distributors provided with a spreading pipe fastened to the oscillatory body the dial lines 15 on the supporting member may also be provided with digits indicating, for example, the spreading width i.e. the width of soil across which the fertilizer will spread. In order to facilitate the adjustment the rim 14 is preferably provided with a handle 17 so that the supporting member 7 can be readily turned. The position once locked for the supporting member 7 can be locked by a locking member 18 shown in FIGS. 3 and 5 in the form of a screw that can be screwed into the rim and is pressed against the side face of the fly-wheel 2.

FIGS. 6 and 7 show a variant in which the projecting handle 17 is formed by a polygonal extension, in this case a hexagonal extension. A fixing plate 19 has a correspondingly shaped hole so that after the plate is mounted on the fly-wheel the supporting member can no longer be turned. If the fixing plate 19 is made from thin, elastic sheet, the setting of the supporting member only requires to bend away the fixing plate, to turn the supporting member and to release the fixing plate. In the embodiment shown the hexagonal flap is undercut so that when the fixing plate is depressed, the hexagonal head is free and readily accessible.

Within the scope of the invention other embodiments of the eccentrically displaceable location of the coupling element in the fly-wheel are possible. It can be imagined to use a radially extending screw spindle, along which the bearing is displaceable in a radial direction by turning the screw spindle. On the other hand the circle-cylindrical shape of the supporting member 7 may be changed so that the outer surface of the thin-walled sleeve 8 exhibits the shape of a polygon. The corresponding recess in the fly-wheel also has this polygonal shape so that by removing and re-inserting the supporting member it angular position in the fly-wheel can be adjusted.

What is claimed is:

1. A device for converting a rotary movement into an oscillating movement comprising a rotatable driving shaft, a fly-wheel rigidly secured thereto, an oscillatorily driven body oscillating about an axis crossing the axis of the driving shaft and a coupling element pivoted to said body and journalled eccentrically in the fly-wheel, the bearing of the coupling element in the fly-wheel being displaceably arranged for varying the eccentricity and hence the amplitude of the oscillatory movement, and the fly-wheel bearing of the coupling element being eccentrically accommodated in a supporting member, which can be disposed in more than one angular position in the fly-wheel.

2. A device as claimed in claim 1 characterized in that said member has a circle-cylindrical shape.

3. A device as claimed in claim 2 characterized in that said member is constructed in the form of a thin-walled sleeve, both ends of which are provided with outwardly projecting collars.

4. A device as claimed in claim 1 characterized in that said member is constructed in the form of a thin-walled sleeve, both ends of which are provided with outwardly projecting collars.

5. A device as claimed in claim 4 characterized in that the thin-walled sleeve eccentrically accommodates a second thin-walled sleeve, the two ends of the sleeve wall being provided with inwardly directed collars for receiving the bearing of the coupling element.

6. A device as claimed in claim 1 characterized in that the supporting member is made from a material suitable for injection-casting.

7. A device as claimed in claim 1 characterized in that the supporting member is provided with a dial for indicating the angular position of the supporting member in the fly-wheel.

8. A device as claimed in claim 1 characterized in that the supporting member is provided with a locking element for fixing an adjusted angular position.

9. A device as claimed in claim 8 characterized in that the supporting member is provided with a handle.

10. A device as claimed in claim 9 characterized in that the handle projects out of the fly-wheel and has a polygonal or non-circular circumferential surface, the locking element being formed by a fixing plate suitable for co-operation with said circumferential surface.

11. A device as claimed in claim 10 characterized in that the projecting handle is undercut.

12. A device for converting rotary motion to oscillating movement comprising, in combination:
   a drive shaft rotatable about a first axis, and a flywheel fixed to said drive shaft;
   a driven shaft rotatably supported for oscillating movement about a second axis perpendicular to said first axis, said first and second axes intersecting at a point spaced from said flywheel;
   a coupling member pivotally connected at one end to said driven shaft about a third axis which is perpendicular to said first and second axes and intersects therewith at said point, and bearing means journalling the other end of said coupling member in said flywheel at a position radially displaced from said first axis whereby said coupling member extends from said point to said position at an acute angle with respect to said first axis, said bearing means comprising a bearing receiving said other end of the coupling member and a support member for said bearing and carried by said flywheel; and
   means for adjusting said support member relative to said flywheel to vary the radial disposition of said bearing and thereby change the location of said position.

13. A device as defined in claim 12 wherein said bearing is eccentrically mounted in said support member, said flywheel having an opening defining a fourth axis intersecting said other axes at said point, said support member being seated in said opening, and said means for adjusting comprising mechanism for locating said support member in selected rotational positions within said opening.

14. A device as defined in claim 13 wherein said opening and the cooperating surface of said support member are cylindrical whereby said support member is freely rotatable in said opening, and said mechanism locks said support member in a selected rotational position.

15. A device as defined in claim 13 wherein said support member includes a non-circular head projecting outwardly from said flywheel, said mechanism comprising a locking member receiving said head and fixed to said flywheel.

16. A device as defined in claim 15 wherein said head is provided with an undercut portion and said locking member is formed of resilient material whereby to be deformed into alignment with said undercut portion thereby to release said head for rotation.

* * * * *